(12) United States Patent
Hoffstein et al.

(10) Patent No.: US 9,722,798 B2
(45) Date of Patent: Aug. 1, 2017

(54) DIGITAL SIGNATURE METHOD

(71) Applicant: Security Innovation Inc., Wilmington, MA (US)

(72) Inventors: Jeffrey Hoffstein, Providence, RI (US); Jill Pipher, Providence, RI (US); John M Schanck, Somerville, MA (US); Joseph H Silverman, Needham, MA (US); William J Whyte, Belmont, MA (US)

(73) Assignee: Security Innovation Inc., Wilmington, MA (US)

( * ) Notice: Subject to any disclaimer, the term of this patent is extended or adjusted under 35 U.S.C. 154(b) by 289 days.

(21) Appl. No.: 14/544,426

(22) Filed: Jan. 5, 2015

(65) Prior Publication Data

US 2015/0229478 A1  Aug. 13, 2015

Related U.S. Application Data (60) Provisional application No. 61/965,912, filed on Feb. 10, 2014.

(51) Int. Cl.
*H04K 1/00* (2006.01)
*H04L 9/00* (2006.01)
*H04L 9/32* (2006.01)
*H04L 9/30* (2006.01)

(52) U.S. Cl.
CPC .......... *H04L 9/3247* (2013.01); *H04L 9/3093* (2013.01); *H04L 9/3236* (2013.01); *H04L 9/3255* (2013.01)

(58) Field of Classification Search
None
See application file for complete search history.

(56) References Cited

U.S. PATENT DOCUMENTS

| | | | |
|---|---|---|---|
| 6,076,163 A | 6/2000 | Hoffstein | 713/168 |
| 6,081,597 A | 6/2000 | Hoffstein | 380/28 |
| 6,298,137 B1 | 10/2001 | Hoffstein | 380/30 |

(Continued)

OTHER PUBLICATIONS

"Learning a Parallelepiped: Cryptanalysis of GGH and NTRU Signatures", P.Q. Nguyen and O. Regev, Advances in Cryptography—Eurocrypt 2006, Lecture Notes, in Computer Science, vol. 4004, Springer, Berlin (2006).

"NTRUSign: Digital Signatures Using the NTRU Lattice", J. Hoffstein, N. Howgrave Graham, J. Pipher, J. Silverman, and W. Whyte, Topics in Cryptology-CT-RSA 2003, Lecture Notes in Computer Science, vol. 2612, Springer, Berlin (2003).

(Continued)

*Primary Examiner* — Kenny Lin
(74) *Attorney, Agent, or Firm* — Martin Novack (57) ABSTRACT

A method for signing and subsequently verifying a digital message, including the following steps implemented using at least one processor-based subsystem: selecting parameters including an integer q and a relatively smaller integer p that is coprime with q; generating random polynomial f relating to p and random polynomial g relating to q; producing a public key that includes h, where h is equal to a product that can be derived using g and the inverse of f mod q; producing a private key from which f and g can be derived; storing the private key and publishing the public key; producing a message digest by applying a hash function to the digital message; producing a digital signature using the message digest and the private key; and performing a verification procedure utilizing the digital signature and the public key to determine whether the signature is valid.

14 Claims, 7 Drawing Sheets

(56) References Cited

U.S. PATENT DOCUMENTS

| | | | |
|---|---|---|---|
| 6,959,085 B1 | 10/2005 | Hoffstein | 380/30 |
| 7,308,097 B2 * | 12/2007 | Hoffstein | H04L 9/3247 380/277 |
| 7,856,554 B2 * | 12/2010 | Lapstun | G06F 3/03545 380/51 |
| 7,913,088 B2 | 3/2011 | Hoffstein | 713/180 |
| 2002/0136401 A1 * | 9/2002 | Hoffstein | H04L 9/3255 380/30 |
| 2004/0076291 A1 * | 4/2004 | Geiringer | H04L 9/3093 380/28 |
| 2004/0078576 A1 * | 4/2004 | Geitinger | G06F 7/582 713/181 |
| 2004/0151309 A1 * | 8/2004 | Gentry | H04L 9/3281 380/30 |
| 2005/0138382 A1 * | 6/2005 | Hougaard | G06Q 10/10 713/176 |
| 2009/0094452 A1 * | 4/2009 | Shao | H04L 9/0844 713/151 |
| 2009/0313171 A1 * | 12/2009 | Yacobi | H04L 9/321 705/51 |
| 2011/0246780 A1 * | 10/2011 | Yeap | G06Q 20/02 713/176 |
| 2013/0129090 A1 * | 5/2013 | Kipnis | H04L 9/3073 380/255 |
| 2014/0164765 A1 * | 6/2014 | Hernandez Encinas | H04L 9/30 713/156 |
| 2015/0033025 A1 * | 1/2015 | Hoffstein | H04L 9/3026 713/176 |

OTHER PUBLICATIONS

Hoffstein, J., Silverman, J.H.: Polynomial Rings and Efficient Public Key Authentication II. In: Lam, K.Y., Shparlikski, I., Wang, H., Xing, C. (eds.), Cryptography and Computational Number Theory, Progress in Computer Science and Applied Logic, vol. 20, pp. 269-286, Birkhauser (2001).

Lyubashevsky, V., Fiat-Shamir With Aborts, Applications to Lattice and Factoring-Based Signatures, In: ASIACRYPT 2009, pp. 598-616. Springer (2009).

Gentry, C., Peikert, C., Vaikuntanathan, V.: How to Use a Short Basis: Trapdoors for Hard Lattices and New Cryptographic Constructions. In: Proceedings of the 40th Annual ACM Symposium on Theory of Computing. pp. 197-206. STPC 2008, ACM (2008).

Lyubashevsky, V.: Lattice-Based Identification Schemes Secure Under Active Attacks. In: Cramer, R. (ed.) PKC 2008, LNCS, vol. 4939, pp. 162-179. Springer (2008).

Lyubashevsky, V., Micciancio, D.: Generalized Compact Knapsacks Are Collision Resistant. In: Bugliesi, M., Preneel, B., Sassone, V., Wegener, I. (eds.) Automata, Languages and Programming, LNCS, vol. 4052, pp. 144-155. Springer (2006).

Güneysu, T., Lyubashevsky, V., Pöppelmann, T.: Practical Lattice Based Cryptography: A Signature Scheme for Embedded Systems. In: Prouff, E., Schaumont, P. (eds.) CHES 2012, LNCS, vol. 7428, pp. 530-547. Springer (2012).

Ducas, L., Durmus, A., Lepoint, T., Lyubashevsky, V.: Lattice Signatures and Bimodal Gaussians. In: Canetti, R., Garay, J.A. (eds.) CRYPTO 2013, LNCS, vol. 8042, pp. 40-56. Springer (2013).

* cited by examiner

DIGITAL SIGNATURE METHOD

RELATED APPLICATION

This application claims priority from U.S. Provisional Patent Application No. 61/965,912 filed Feb. 10, 2014, and said Provisional Patent Application is incorporated herein by reference.

FIELD OF THE INVENTION

This invention relates to the field of cryptography and, more particularly, to a public key digital signature technique.

BACKGROUND OF THE INVENTION

Public key digital signatures are important for secure exchange of information between plural parties, for example between computers or mobile devices, or between a smart card and a terminal.

A digital signature and authentication method and apparatus, which has in the past demonstrated advantageous operation, is described in U.S. Pat. No. 7,308,097, assigned to the same assignee as the present Application, incorporated by reference, and sometimes referred to as "NTRUSign" (mark of NTRU Cryptosystems, Inc.). Reference can also be made to "NTRUSign: Digital Signatures Using the NTRU Lattice", J. Hoffstein, N. Howgrave Graham, J. Pipher, J. Silverman, and W. Whyte, Topics In Cryptology-CT-RSA 2003, Lecture Notes in Computer Science, Vol. 2612, Springer, Berlin, 2003, also incorporated by reference.

The signing technique in the '097 Patent uses a mixing system based on multiplication in a ring and reduction modulo an ideal q in that ring; while the verification technique uses special properties of products of elements whose validity depends on elementary probability theory. The security of the identification/digital signature scheme comes from the interaction of reduction modulo q and the difficulty of forming products with special properties. In an embodiment of the digital signature scheme of the '097 Patent, the security also relies on the experimentally observed fact that for most lattices, it is very difficult to find a vector whose length is only a little bit longer than the shortest vector, and it is also difficult to find a lattice vector that is quite close to a randomly chosen nonlattice vector.

Although the technique of the '092 Patent has provided acceptable performance, and has exhibited good security, there is a need for an improved digital signature technique that is more efficient to use and has even better security. It is among the objectives of the present invention to provide improvement over the technique of the '092 Patent and over other prior art techniques relating to digital signatures.

SUMMARY OF THE INVENTION

One drawback of the prior art, which is addressed by features of the present invention, is the relative complexity and computational requirements for key generation and signing. Another drawback is that every signature leaked some information about the private signing key, a fact that was eventually exploited to break the vanilla version of "NTRUSign" with no perturbations (see "Learning A Parallelepiped: Crypanalysis of GGH and NTRU Signatures", P. Q. Nguyen and O. Regev, Advances in Cryptography—Eurocrypt 2006, Lecture Notes, in Computer Science, Vol. 4004, Springer, Berlin, 2006).

Applicant has discovered that through the use of two coprime integers, it is possible to create signatures using only a short half-basis. A further feature hereof involves the introduction of a rejection sampling technique in the context of an "NTRUSign" type of signature scheme, which assures that transcript distributions are completely decoupled from the keys that generate them. (Background rejection sampling is described, for example, in Lyubashevsky, V., Fiat-Shamir With Aborts, Applications to Lattice and Factoring-Based Signatures, In: ASIACRYPT 2009, pp. 598-616. Springer (2009). Reference can also be made to copending U.S. patent application Ser. No. 14/121,041, assigned to the same assignee as the present Application.)

In accordance with a form of the invention, a method is set forth for signing and subsequently verifying a digital message, comprising the following steps implemented using at least one processor-based subsystem: selecting parameters including an integer q and a relatively smaller integer p that is coprime with q; generating random polynomial f relating to p and random polynomial g relating to q; producing a public key that includes h, where h is equal to a product that can be derived using g and the inverse off mod q; producing a private key from which f and g can be devived; storing the private key and publishing the public key; producing a message digest by applying a hash function to the digital message; producing a digital signature using the message digest and the private key; and performing a verification procedure utilizing the digital signature and the public key to determine whether the signature is valid. In an embodiment of this form of the invention, the step of producing a digital signature comprises the following steps: (A) generating a noise polynomial; (B) deriving a candidate signature using the private key, the message digest, and the noise polynomial; (C) determining whether the coefficients of the candidate signature are within a predetermined range; and (D) repeating steps (A) through (C) until the criterion of step (C) is satisfied, and outputting the resultant candidate signature as the produced digital signature.

An embodiment of the invention further comprises transmitting the digital signature and, in this embodiment, the step of performing a verification procedure includes receiving the transmitted digital signature and performing the verification procedure on the received digital signature. In a variation of this form of the invention, the digital message can comprise a challenge communication from a verifier entity, and the digital signature can be transmitted to said verifier entity.

The prior art "NTRUSign" technique of U.S. Pat. No. 7,308,097 is based directly on the close vector problem. In other words, given a point in lattice space, the signer demonstrates that they can find a point in the lattice near to it. This requires the signer to know a full basis for the lattice, so during key generation "NTRUSign" has to generate a complete basis. It does this by starting with a half-basis (f, g) and completing the basis by finding (F, G). (See, again, the '097 Patent and the above-referenced "NTRUSign" paper). In contrast, in the present invention, after key generation, the signer demonstrates a different ability: that given one lattice point, they can find another lattice point close by with a particular property. (Call the second lattice point the signature; in this case, the property is that the signature is equal to the message representative when taken mod p). Here, signing doesn't require the signer to know a full basis. The signer just needs to know enough short lattice vectors to find a vector that has the desired property. An advantage hereof is that this can be done with only a half-basis. This allows key generation to stop after generating half the basis, without requiring the computationally intensive step of completing the basis. It also makes signing more efficient as only the relatively smaller half-basis need be used.

Further features and advantages of the invention will become more readily apparent from the following detailed description when taken in conjunction with the accompanying drawings.

DETAILED DESCRIPTION

Figure 1:
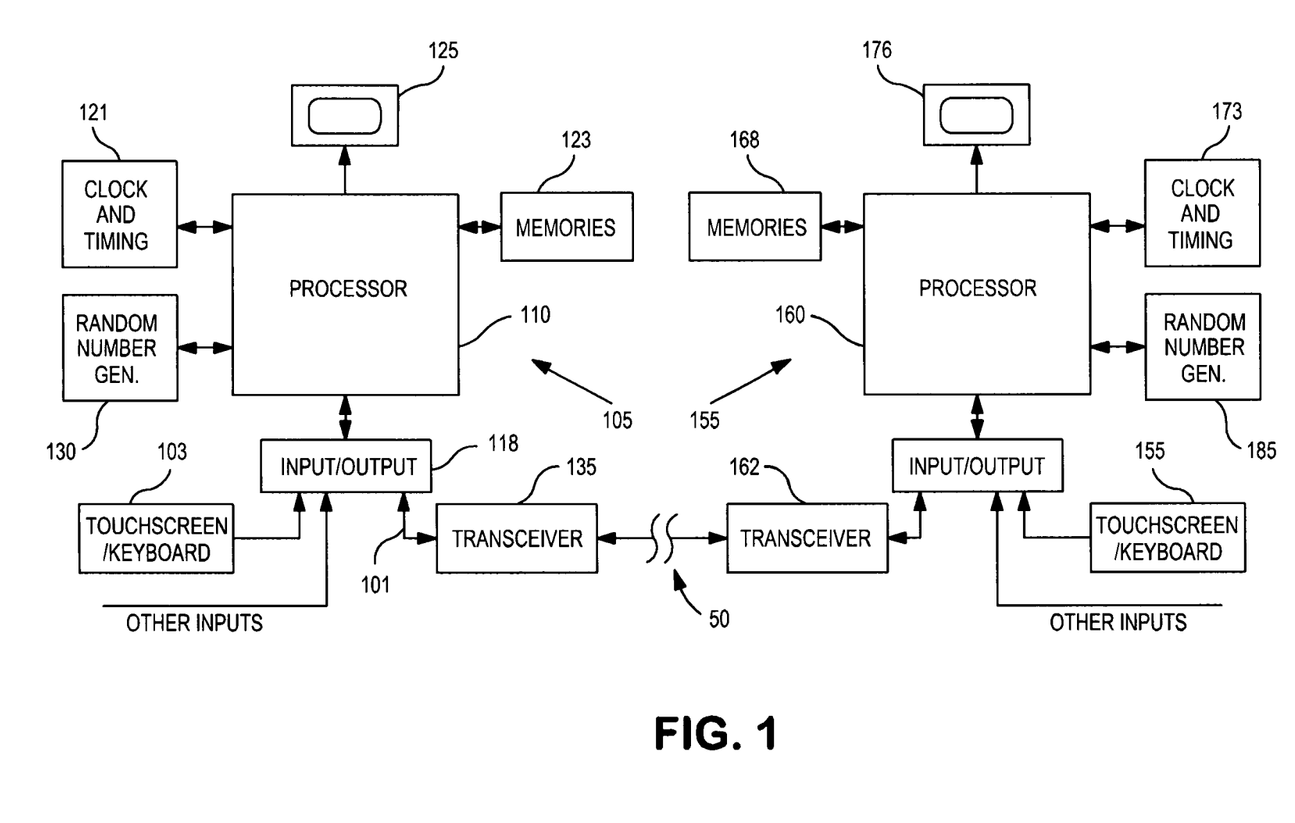
FIG. 1 is a block diagram of a system that can be used in practicing embodiments of the invention.

FIG. 1 is a block diagram of a system that can be used in practicing embodiments of the invention. Two processor-based subsystems 105 and 155 are shown as being in communication over an insecure channel 50, which may be, for example, any wired or wireless communication channel such as a telephone or internet communication channel. The subsystem 105 includes processor 110 and the subsystem 155 includes processor 160. The subsystems can typically comprise mobile devices, computers, or terminals. When programmed in the manner to be described, the processors 110 and 160 and their associated circuits can be used to implement an embodiment of the invention and to practice an embodiment of the method of the invention. The processors 110 and 160 may each be any suitable processor, for example an electronic digital processor or microprocessor. It will be understood that any general purpose or special purpose processor, or other machine or circuitry that can perform the functions described herein, electronically, optically, or by other means, can be utilized. The subsystem 105 will typically include memories 123, clock and timing circuitry 121, input/output functions 118 and display 125, which may all be of conventional types. Inputs can include a touchscreen/keyboard input as represented at 103. Communication is via transceiver 135, which may comprise a modem or any suitable device for communicating signals.

The subsystem 155 in this illustrative embodiment can have a similar configuration to that of subsystem 105. The processor 160 has associated input/output circuitry 164, memories 168, clock and timing circuitry 173, and a display 176. Inputs include a touchscreen/keyboard 155. Communication of subsystem 155 with the outside world is via transceiver 162 which, again, may comprise a modem or any suitable device for communicating signals.

Figure 2:
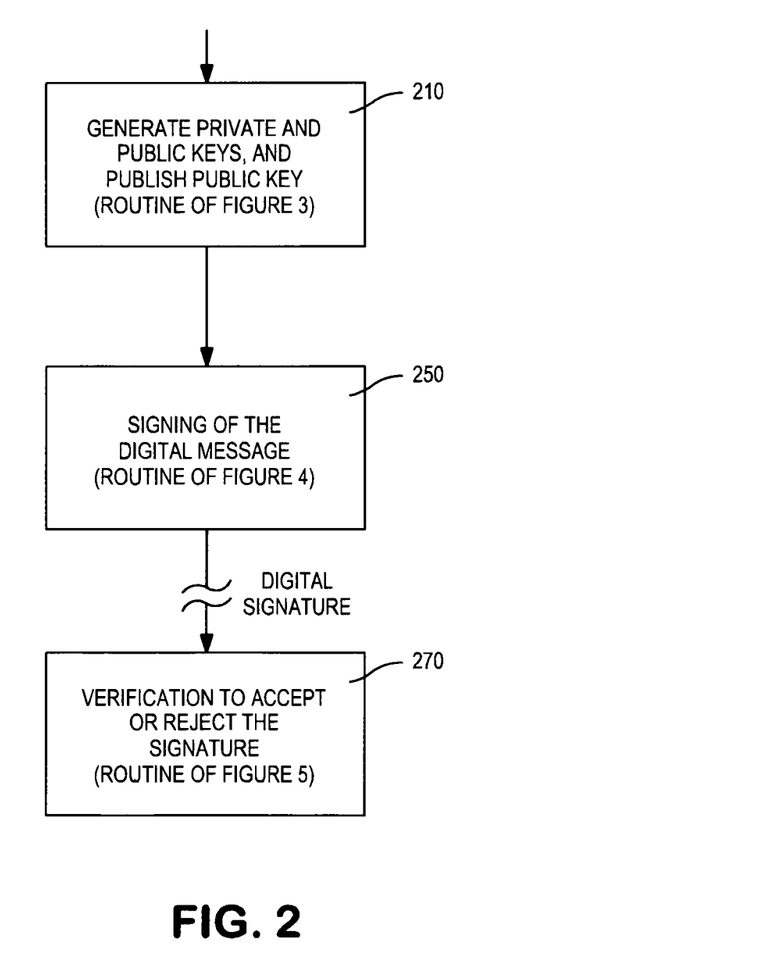
FIG. 2 is a flow diagram of a public key digital signature technique which, when taken with the subsidiary flow diagrams referred to therein, can be used in implementing embodiments of the invention.

FIG. 2 illustrates a basic procedure that can be utilized with a public key digital signature technique, and refers to routines illustrated by other referenced flow diagrams which describe features in accordance with an embodiment of the invention. Reference can also be made to Appendix I for further details of the invention. The block 210 represents the generating of the public key and private key signals and data, and the publishing of the public key. The routine of an embodiment thereof is described in conjunction with the flow diagram of FIG. 3. In the present example, this operation can be performed, for example, at the processor-based subsystem 105 of FIG. 1. The public key information can be published; that is, made available to any member of the public or to any desired group to whom the private key holder desires to send the digital signatures. Typically, although not necessarily, the public key may be made available at a central public key library facility or website where a directory of public key holders and their public keys are maintained.

The block 250 represents a routine that can be employed (that is, in this example, by the user of processor-based subsystem 155 of FIG. 1) for signing the digital message. This routine, in accordance with an embodiment of the invention, is described in conjunction with the flow diagram of FIG. 4. In this example, the digital signature is then transmitted over the channel 50 (FIG. 1).

The block 270 represents a routine that can be employed (that is, in this example, by the user of processor-based subsystem 155 of FIG. 1) for using, inter alia, the public key to implement a verification procedure to either accept or reject the digital signature. This routine, in accordance with an embodiment of the invention, is described in conjunction with the flow diagram of FIG. 5.

Figure 3:
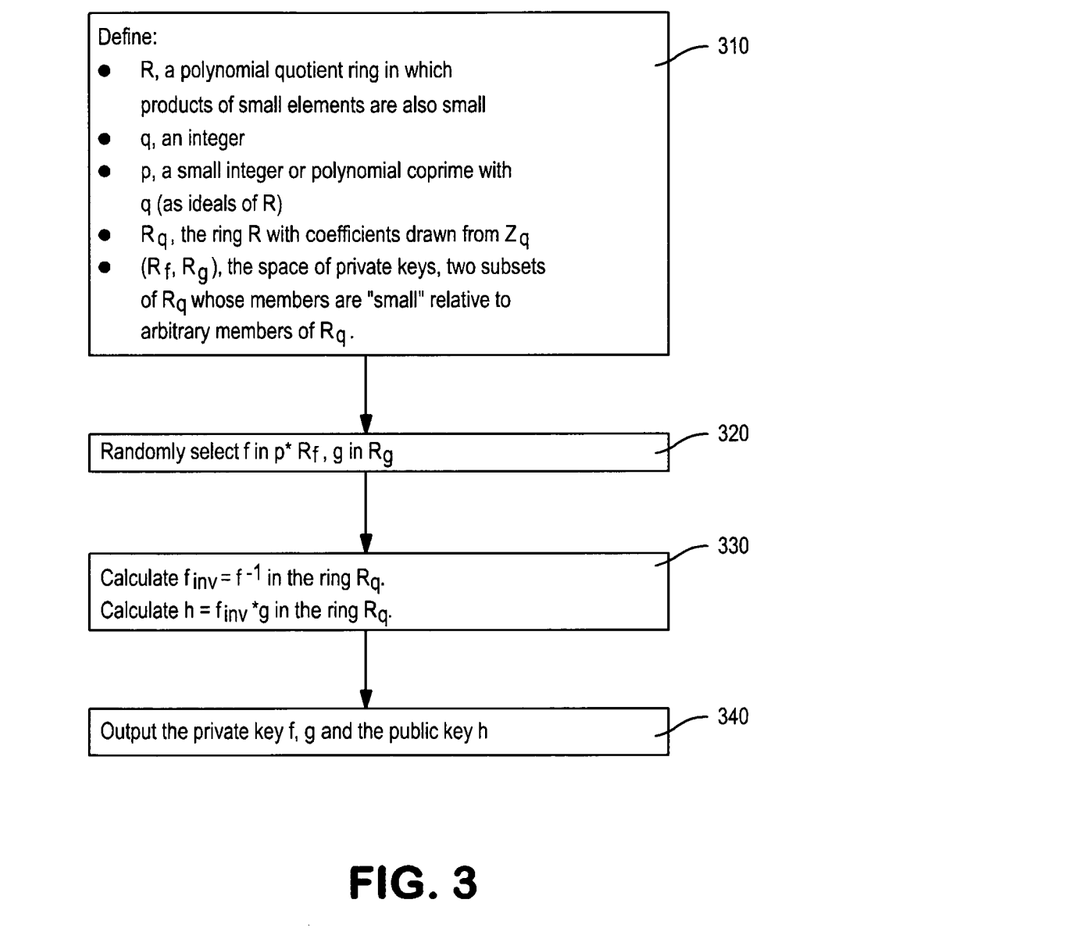
FIG. 3 is a flow diagram, in accordance with an embodiment hereof, of a routine for key generation.

FIG. 3 is a flow diagram of a routine, represented by the block 210 of FIG. 2, in accordance with an embodiment of the invention, for implementing key generation. Reference can also be made to Appendix I. The block 310 represents the defining and/or inputting of parameters used in key generation, which include: R, a polyhnomial quotient ring in which products of small elements are also small; q, an integer; p, a small integer or polynomial coprime with q (as ideals of R); Rq, the ring with coefficients drawn from Zq (where Zq is the integers taken mod q); and ($R_f$, $R_g$), the space of private keys, two subsets of the ring Rq whose members are "small" relative to arbitrary members of Rq. The block 320 represents the step of randomly selecting f in $p*R_f$ and g in $R_g$. [As described in Appendix I, the random polynomials can be chosen such that f is p times a trinary polynomial and such that $\|g\| \le p/2$. Writing f=pF, so F is trinary, it is assumed that F is invertible modulo q and modulo p. If not, this f can be discarded and a new one chosen.] Then, as represented by the block 330, the inverse of f (that is, $f^{-1}$) in the ring Rq, called $f_{inv}$, is computed, and h is computed as $h=f_{inv}*g$ in the ring q. The private key f, g and the public key h can then be output, as represented by the block 340.

Figure 4:
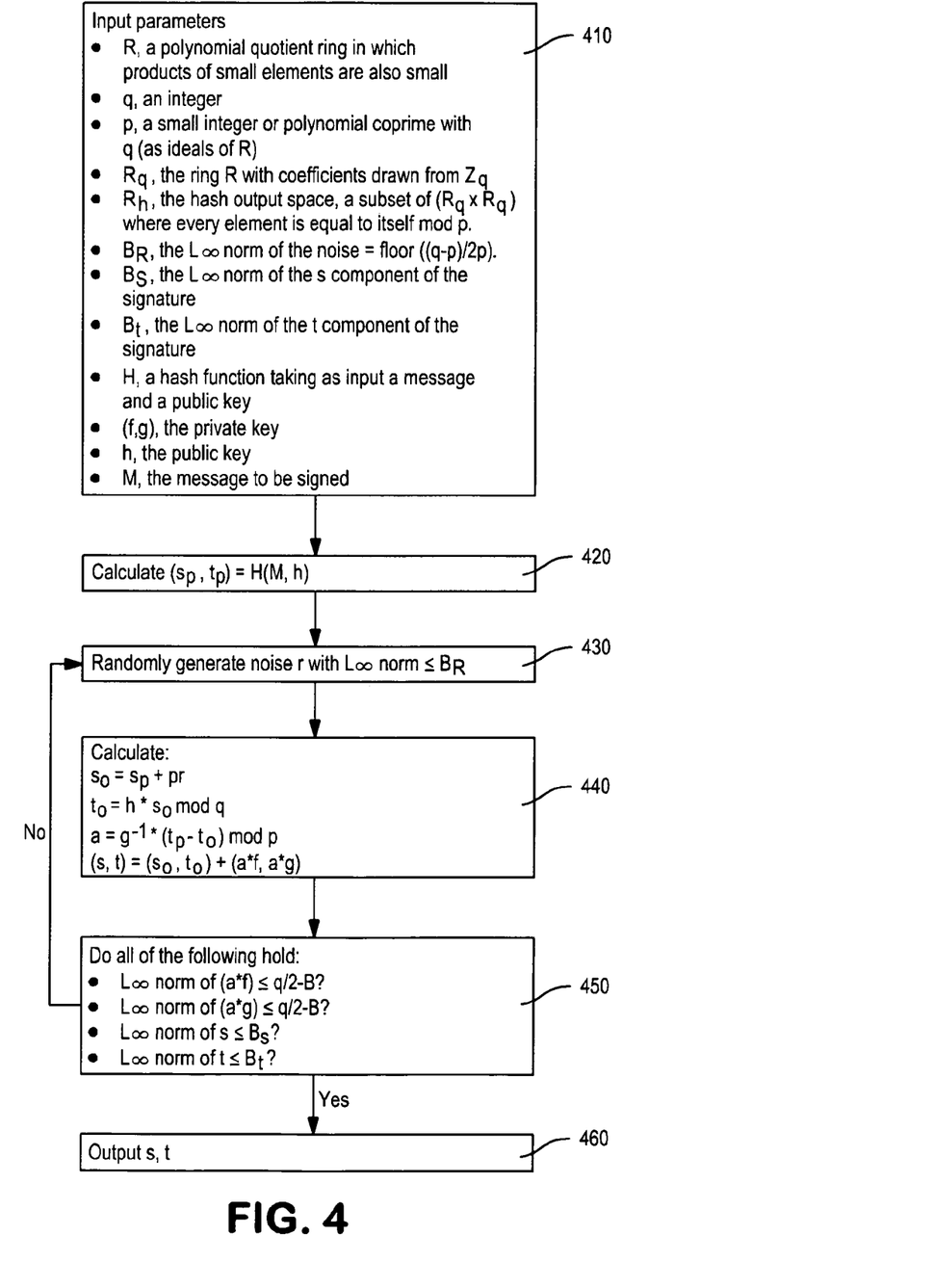
FIG. 4 is a flow diagram, in accordance with an embodiment hereof, of a routine for signing a digital message.

FIG. 4 is a flow diagram of a routine, represented by the block 240 of FIG. 2, in accordance with an embodiment of the invention, for implementing the signing of a digital message using, inter alia, the private key. Reference can also be made to Appendix I.

Referring to FIG. 4, the block 410 represents the inputting of the following: R, a polynomial quotient ring in which products of small elements are also small; q, an integer; p, a small integer or polynomial coprime with q (as ideals of R); $R_q$, the ring R with coefficients drawn from $Z_q$; $R_h$, the hash output space, a subset of ($R_q \times R_q$) where every element is equal to itself mod p; $B_R$, the $L_\infty$ norm of the noise=floor $((q-p)/2p)$; $B_s$, the $L_\infty$ norm of the s component of the signature; $B_t$, the $L_\infty$ norm of the t component of the signature; H, a hash function taking as input a message and a public key; (f, g), the private key; h, the public key; and M, the message to be signed. (M corresponds to μ in Appendix I).

As represented by the block 420, a document hash, mod p, designated $(s_p, t_p)$, is calculated as H(M, h); that is the hash of the message and the public key. Next, the loop of blocks 430, 440, and 450 implements the rejection sampling of candidate signatures, and selection of a candidate signature that meets a size criterion (see also Appendix I). The block 430 represents randomly generating noise r with $L_\infty$ norm less than or equal to $B_R$. The block 440 represents the successive calculations of $s_0$, $t_0$, a, and (s, t) as follows:

$$s_0 = s_p + pr$$

$$t_0 = h*s_0 \bmod q$$

$$a = g^{-1}*(t_p - t_0) \bmod q$$

$$(s, t) = (s_0, t_0) + (a*f, a*g)$$

Next, the decision block 450 represents the step of determining whether the coefficients of the candidate signature and its components are in a predetermined range, dependent on range-defining integers. In this embodiment, a determination is made of whether all of the following are true:

$L_\infty$ norm of $(a*f) \leq q/2 - B$?

$L_\infty$ norm of $(a*g) \leq q/2 - B$?

$L_\infty$ norm of $s \leq B_s$?

$L_\infty$ norm of $\leq B_t$?

If not, the block 430 is re-entered, and the process steps of blocks 430, 440 and 450 are repeated until a candidate digital signature which meets the criteria of block 450 is obtained. The block 460 is then entered, this block representing the outputting of the qualifying candidate signature, that is, the encoded signed message s, or (s, t) (see Appendix 1).

Figure 5:
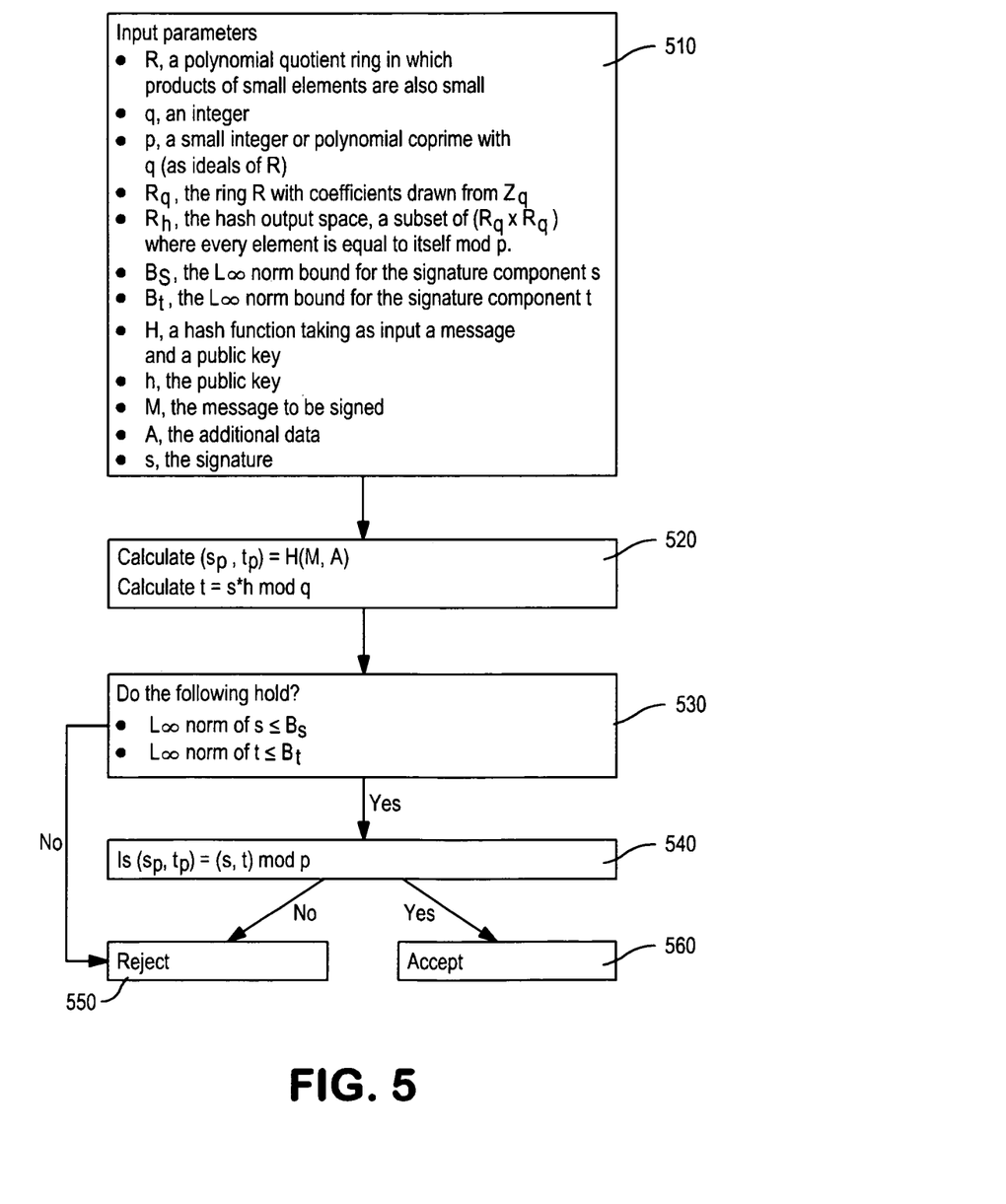
FIG. 5 is a flow diagram, in accordance with an embodiment hereof, of a routine for verification of a digital signature.

FIG. 5 is a flow diagram of a routine, represented by the block 270 of FIG. 2, in accordance with an embodiment of the invention, for implementing verification of whether the received digital signature is valid. Reference can also be made to Appendix I.

The block 510 represents the inputting of the following: R, a polynomial quotient ring in which products of small elements are also small; q, an integer; p, a small integer or polynomial coprime with q (as ideals of R); $R_q$, the ring R with coefficients drawn from $Z_q$; $R_h$, the hash output space, a subset of $(R_q \times R_q)$ where every element is equal to itself mod p; $B_s$, the $L_\infty$ norm of the s component of the signature; $B_t$, the $L_\infty$ norm of the t component of the signature; H, a hash function taking as input a message and a public key; h, the public key; M, the message; A, the additional data; and s, the signature. (The additional data is typically added to the hash of the message for enhanced security.)

Next, as represented by the block 520, the following calculations are made:

$$(s_p, t_p) = H(M, A)$$

$$t = s*h \bmod q$$

A determination is then made (decision block 530) as to whether both of the following hold:

The $L_\infty$ norm of $s \leq B_s$

The $L_\infty$ norm of $t \leq B_t$

If not, the signature is rejected (block 550). If, however, the inquiry of block 530 is answered affirmatively, the decision block 540 is entered, this block representing the inquiry of whether $(s_p, t_p)$ equals (s, t) mod p. If not, the signature is rejected (block 550) (s, t) mod p or, if so, the signature is accepted (block 560).

Figure 6:
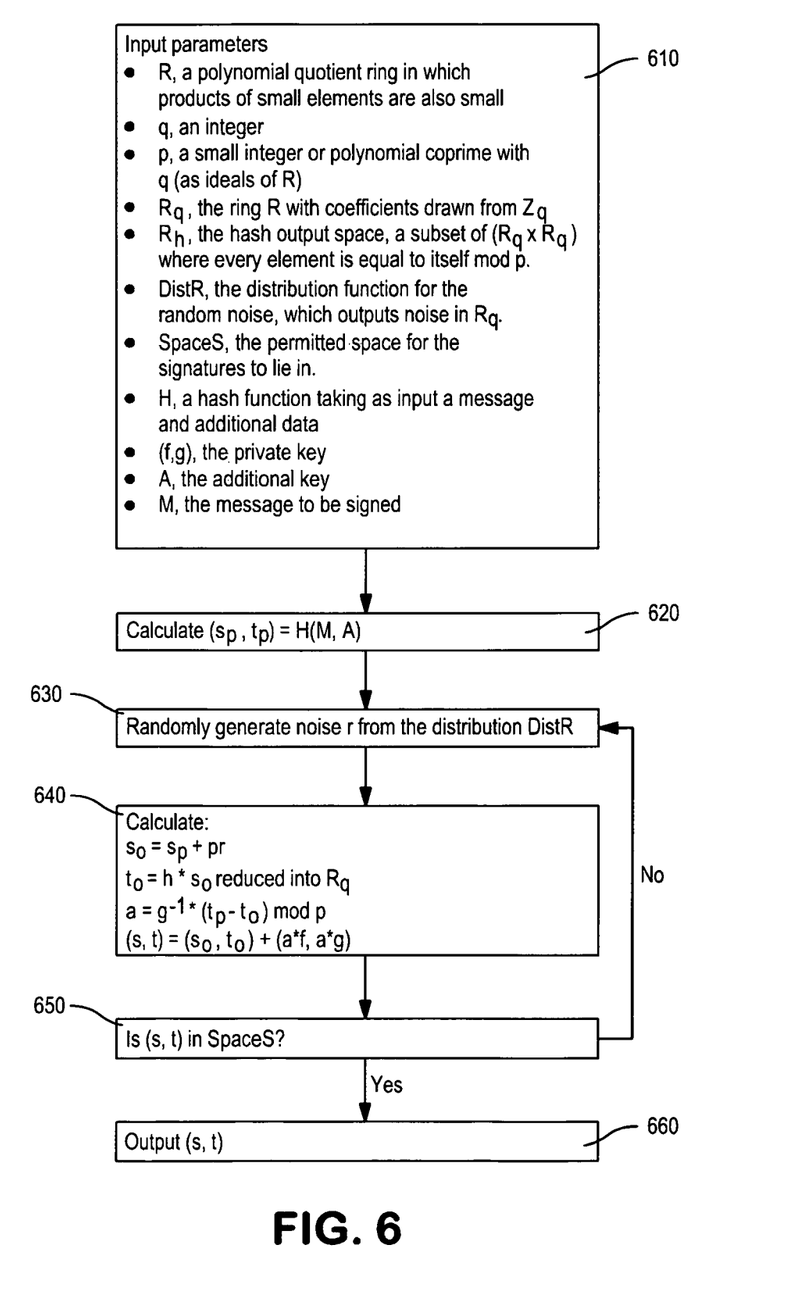
FIG. 6 is a flow diagram, in accordance with another embodiment hereof, of a routine for signing a digital message.
Figure 7:
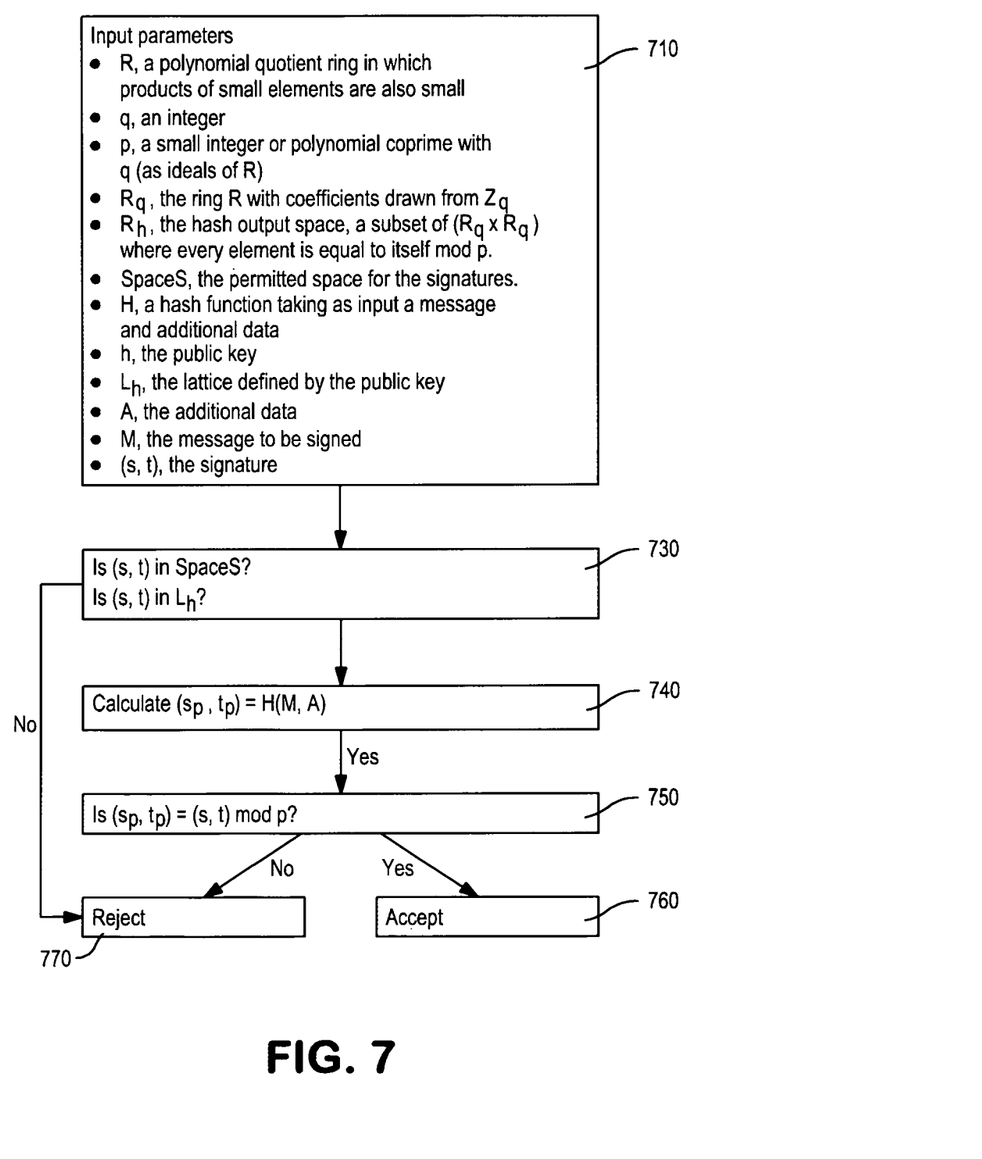
FIG. 7 s a flow diagram, in accordance with another embodiment hereof, of a routine for verification of a digital signature.

FIGS. 6 and 7 respectively illustrate a further embodiment of the signing routine of FIG. 4 and a further embodiment of the verification routine of FIG. 5. The routines are similar to those of their counterparts but, in some respects, are generalized to show that variations can be implemented within the intended scope hereof.

In the signing routine of FIG. 6, the block 610 corresponds to block 410 of FIG. 4, except that in this case, an input is provided for DistR, the distribution function for the random noise, which outputs noise in Rq, and an input is provided for SpaceS, the permitted space for the signatures to lie in. Also, in this case, as represented by block 620, $(s_p, t_p)$ is calculated as H (M, A), where A is the input additional data added to the hash function. The block 630 represents the step of randomly generating noise r from the distribution DistR. Then, the calculations of block 640 correspond to the previously described calculations of block 440. Inquiry is then made (decision block 650) as to whether (s, t) is in SpaceS. If not, block 630 is re-entered, and the steps of blocks 630, 640, and 650 are repeated until a candidate digital signature which meets the criterion of block 650 is obtained. The block 650 is then entered, this block representing the outputting of the qualifying candidate signature; that is, the signed message (s, t). In this manner, rejection sampling is achieved. Regarding the more generalized verification routine of FIG. 7, the block 710 corresponds to block 510 of FIG. 5, except that in this case, inputs are provided for SpaceS and $L_h$, the lattice defined by the public key. Inquiry is made (block 730) as to whether (s, t) is in SpaceS and (s, t) is in $L_h$. If not, the signature is rejected (block 770). If so, $(s_p, t_p)$ is calculated as H(M, A) (block 740), and inquiry is made (decision block 750) as to whether $(s_p, t_p)$ equals (s, t) mod p. If not, the signature is rejected (block 770). If so, however, the signature is accepted.

The invention has been described with reference to particular preferred embodiments, but variations within the spirit and scope of the invention will occur to those skilled in the art. For example, while a digital signature technique has been described, it will be understood that an authentication producer of the challenge-response-verification type can alternatively be implemented, using the technique hereof and employing the challenge as the message to be signed. Also, it will be understood that coefficients of polynomials can alternatively be represented in other forms including, but not limited to, matrices.

The invention claimed is:

1. A method for signing and subsequently verifying a digital message, comprising the following steps implemented using at least one processor-based subsystem:

selecting parameters including an integer q and a relatively smaller integer p that is coprime with q;

generating random polynomial f relating to p and random polynomial g relating to q;

producing a public key that includes h, where h is equal to a product that can be derived using g and the inverse of f mod q;

producing a private key from which f and g can be derived;

storing the private key and publishing the public key;
producing a message digest by applying a hash function to the digital message;
producing a digital signature using the message digest and the private key; and
performing a verification procedure utilizing the digital signature and the public key to determine whether the signature is valid.

2. The method as defined by claim 1, wherein said step of producing a digital signature comprises the following steps: (A) generating a noise polynomial; (B) deriving a candidate signature using the private key, the message digest, and the noise polynomial; (C) determining whether the coefficients of the candidate signature are within a predetermined range; and (D) repeating steps (A) through (C) until the criterion of step (C) is satisfied, and outputting the resultant candidate signature as the produced digital signature.

3. The method as defined by claim 1, further comprising transmitting the digital signature, and wherein said step of performing a verification procedure includes receiving the transmitted digital signature and performing the verification procedure on the received digital signature.

4. The method as defined by claim 2, further comprising transmitting the digital signature, and wherein said step of performing a verification procedure includes receiving the transmitted digital signature and performing the verification procedure on the received digital signature.

5. The method as defined by claim 3, wherein said digital message comprises a challenge communication from a verifier entity, and wherein said digital signature is transmitted to said verifier entity.

6. The method as defined by claim 1, wherein integers q and p are ideals of a quotient ring R, and wherein random polynomial f is in $p*R_f$ and random polynomial g taken mod q is in $R_g$, where $R_f$ and $R_g$ are subsets of a ring $R_q$.

7. The method as defined by claim 6, wherein ($R_f$, $R_g$), two subsets of $R_q$, have members that are small relative to arbitrary members of $R_q$.

8. The method as defined by claim 6, wherein said step of producing a digital signature comprises the following steps: (A) generating a noise polynomial; (B) deriving a candidate signature using the private key, the message digest, and the noise polynomial; (C) determining whether the coefficients of the candidate signature are within a predetermined range; and (D) repeating steps (A) through (C) until the criterion of step (C) is satisfied, and outputting the resultant candidate signature as the produced digital signature.

9. The method as defined by claim 6, further comprising transmitting the digital signature, and wherein said step of performing a verification procedure includes receiving the transmitted digital signature and performing the verification procedure on the received digital signature.

10. The method as defined by claim 6, wherein said digital message comprises a challenge communication from a verifier entity, and wherein said digital signature is transmitted to said verifier entity.

11. A method for signing and transmitting a digital message, comprising the following steps implemented using at least one processor-based subsystem:
selecting parameters including an integer q and a relatively smaller integer p that is coprime with q;
generating random polynomial f relating to p and random polynomial g relating to q;
producing a public key that includes h, where h is equal to a product that can be derived using g and the inverse of f mod q;
producing a private key from which f and g can be derived;
storing the private key and publishing the public key;
producing a message digest by applying a hash function to the digital message;
producing a digital signature using the message digest and the private key; and
transmitting the digital signature.

12. The method as defined by claim 11, wherein said step of producing a digital signature comprises the following steps: (A) generating a noise polynomial; (B) deriving a candidate signature using the private key, the message digest, and the noise polynomial; (C) determining whether the coefficients of the candidate signature are within a predetermined range; and (D) repeating steps (A) through (C) until the criterion of step (C) is satisfied, and outputting the resultant candidate signature as the produced digital signature.

13. The method as defined by claim 11, wherein said digital message comprises a challenge communication from a verifier entity, and wherein said digital signature is transmitted to said verifier entity.

14. The method as defined by claim 12, wherein said digital message comprises a challenge communication from a verifier entity, and wherein said digital signature is transmitted to said verifier entity.

* * * * *